United States Patent
Hsiao

(10) Patent No.: US 10,124,635 B1
(45) Date of Patent: Nov. 13, 2018

(54) BICYCLE TIRE PRESSURE CAP

(71) Applicant: Shu-Chun Hsiao, New Taipei (TW)

(72) Inventor: Shu-Chun Hsiao, New Taipei (TW)

( * ) Notice: Subject to any disclaimer, the term of this patent is extended or adjusted under 35 U.S.C. 154(b) by 0 days.

(21) Appl. No.: 15/653,475

(22) Filed: Jul. 18, 2017

(51) Int. Cl.
*B60C 23/04* (2006.01)
*G01L 17/00* (2006.01)

(52) U.S. Cl.
CPC .......... *B60C 23/0496* (2013.01); *G01L 17/00* (2013.01); *Y10T 137/3662* (2015.04); *Y10T 137/3693* (2015.04)

(58) Field of Classification Search
CPC ............... B60C 23/0496; G01L 17/00; Y10T 137/3584–137/3786
USPC ................ 137/227, 229; 152/431; 73/146.8; 116/34 R; 188/67, 83
See application file for complete search history.

(56) References Cited

U.S. PATENT DOCUMENTS

| | | | |
|---|---|---|---|
| 2,731,936 A * | 1/1956 | Fowler | B60C 23/0467 116/34 R |
| 5,886,254 A * | 3/1999 | Chi | B60C 23/0496 116/34 R |
| 6,055,854 A * | 5/2000 | Chen | B60C 23/0496 116/34 R |
| 6,374,666 B1 * | 4/2002 | Lemberger | B60C 23/0496 73/146.8 |
| 6,588,265 B1 * | 7/2003 | Roberson | B60C 23/0496 73/146 |
| 6,595,046 B2 * | 7/2003 | Lemberger | B60C 23/0496 73/146.3 |
| 7,009,505 B2 * | 3/2006 | Huang | B60C 23/0496 116/34 R |
| 7,251,994 B2 * | 8/2007 | Maldonado | B60C 23/0496 73/146 |
| 8,393,349 B2 * | 3/2013 | Chen | B60C 23/0496 116/34 R |
| 9,242,517 B2 * | 1/2016 | Hsiao | B60C 23/0496 |
| 2005/0072349 A1 * | 4/2005 | Perlin | B60C 23/0408 116/34 B |
| 2013/0011766 A1 * | 1/2013 | Lundblad | H01M 8/0202 429/492 |
| 2015/0224832 A1 * | 8/2015 | Hsiao | B60C 23/0496 73/146.8 |

* cited by examiner

*Primary Examiner* — Craig J Price

(57) ABSTRACT

A bicycle tire pressure cap, used with a bicycle tire valve, comprising a metal case, an anti-leak washer, a ventilation disc, a rubber gasket, a floating holder, a warning plug, a spring and a transparent cover. The bicycle tire pressure has a simple structure, low failure rate, low cost, and can quickly indicate whether the tire pressure is sufficient and effectively enhance the riding safety.

6 Claims, 6 Drawing Sheets

BICYCLE TIRE PRESSURE CAP

BACKGROUND OF INVENTION

1. Field of the Invention

The present invention relates generally to a warning device fitted on the bicycle tire valve to indicate whether the tire pressure is normal or not.

2. Description of Related Art

The traditional tire pressure warning cap is a warning device which enables the cyclist to know whether the tire pressure is normal or not quickly. In order to actuate the float gage stably, the mechanical structure of the tire pressure warning cap is relatively complex, and the manufacture is difficult, the manufacturing cost is relatively high, the failure rate is high after a long-term usage, the practicability is poor.

In view of this, the topic of the present invention is to provide a bicycle tire pressure cap to solve the aforesaid problems, which can judge the bicycle tire pressure easily, characterized by low failure rate, easy assembly and low cost, and can guarantee the cycling safety.

SUMMARY OF TILE INVENTION

The present invention provides a bicycle tire pressure cap of completely mechanical structure, low failure rate and low cost, which can indicate whether the tire pressure is sufficient or not quickly to enhance the cycling safety effectively.

The technical field is to provide a bicycle tire pressure cap, used with a bicycle tire valve, comprising a metal case, an anti-leak washer, a ventilation disc, a rubber gasket, a floating holder, a warning plug, a spring and a transparent cover, wherein the metal case sequentially includes an upper orifice and a lower orifice disposed in an upper end thereof, a lower screw hole disposed in a lower end thereof and configured to screw on the tire valve, and a small keyhole disposed between the lower orifice and the lower screw hole for connecting therebetween, and the aperture of the upper orifice is larger than that of the lower orifice; wherein the anti-leak washer is a disc-shaped body having an opening in the center thereof and is located in the lower screw hole, and a top surface thereof is contacted with an inner bottom side of the lower screw hole and a bottom surface thereof is contacted with a top edge of the tire valve to prevent air leak; wherein the ventilation disc is located in the lower orifice and a top part of which is located in the upper orifice, including an air hole in an eccentric position thereof, and a tenon disposed at a center of a bottom surface thereof and fitting the tire valve through the opening; wherein the rubber gasket is a disc-shaped body located in the lower orifice and on a top surface of the ventilation disc, including a frame disposed at an edge thereof, a convex cone disposed in a center thereof, and a groove between the frame and the convex cone; the diameter of the rubber gasket is larger than that of the lower orifice; wherein the floating holder is located at the top of the rubber gasket, from top to bottom, including a hollow top holder having an upward opening and a hollow bottom holder having a downward opening; the diameter of the top holder is greater than the diameter of the bottom holder; the bottom holder having a bottom edge is fitted into the groove; the top holder having an inner bottom surface includes a convex pin in a center thereof; wherein the warning plug is a hollow body, and a bottom end of which is fitted into the top holder, including an annular warning zone disposed on an outer surface thereof and has a color different from that of the floating holder, a disc disposed at a top end thereof, and a sticker affixed to a top surface of the disc and marked with tire pressure; wherein the spring includes an elastic segment in an upper part thereof and a support segment in a lower part thereof. The elastic segment is disposed in the warning plug and the support segment is disposed in the top holder and fitted over the convex pin; wherein the transparent cover is located on a top end of the metal case and covers the warning plug and floating holder which includes a hollow cylindrical body and a flange joined to a bottom end of the body and slightly smaller than the diameter of the body; the flange is inserted into the upper orifice, and a bottom edge of which presses an edge of a top surface of the frame.

More preferably, wherein the air hole is located exactly below said groove.

More preferably, wherein the disc includes a vent hole disposed at a center thereof; the sticker includes a through hole corresponding to the vent hole; the transparent cover includes a micropore corresponding to the vent hole.

More preferably, wherein the overall range of the annular warning zone accounts for at least two-thirds of the total length of the warning plug.

More preferably, wherein the top holder is longer than the bottom holder, and the total length of the bottom holder does not exceed one-third of the total length of the floating holder.

More preferably, wherein the metal case includes an anti-skid outer ring disposed in a middle of an outer surface thereof.

More preferably, wherein the annular warning zone is a coating layer.

The technical effect achieved by the present invention is:

The tire pressure cap of the present invention, the rubber gasket and transparent cover are fitted tightly. Therefore, there will not be floating after the rubber gasket withstands tire pressure, so as to avoid influencing the fluctuation of floating holder, and to reflect the tire pressure correctly. In addition, the transparent cover can be fitted on the metal case tightly.

Besides, the tire pressure cap of the present invention, in order to avoid incorrect tire pressure display, the interconnected air hole, punch hole and microhole can discharge the internal air. This rubber gasket can be actuated smoothly, and the microhole lets air but water through due to surface tension, so that the present invention is very durable and reliable in general.

DETAILED DESCRIPTION OF THE INVENTION

Referring to figures, the details are described below.

Figure 1:
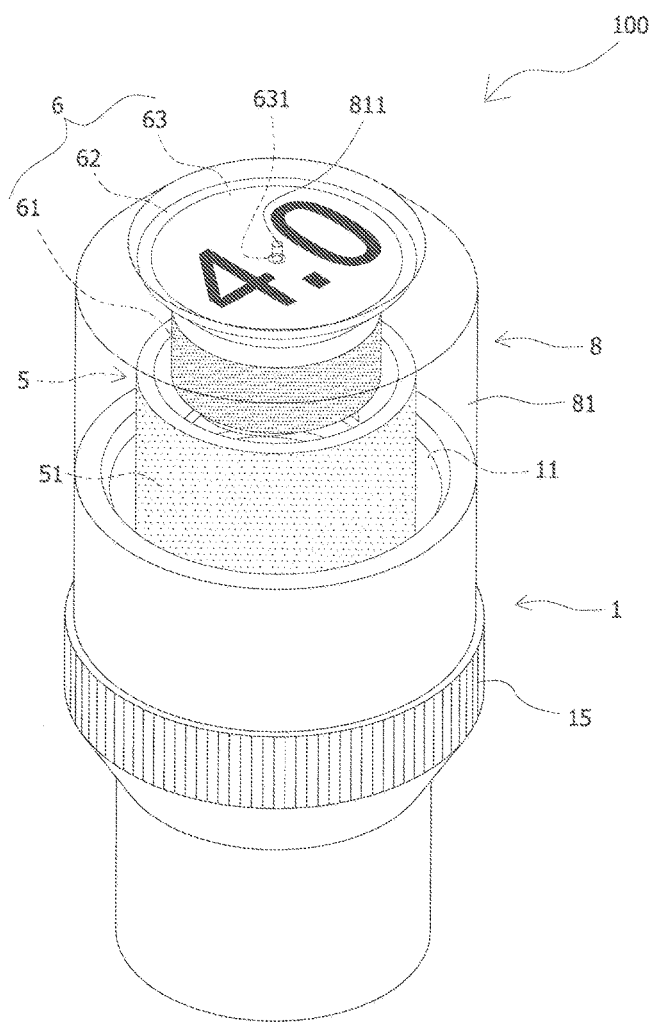
FIG. 1 is a schematic view of a bicycle tire pressure cap of the present invention.
Figure 4:
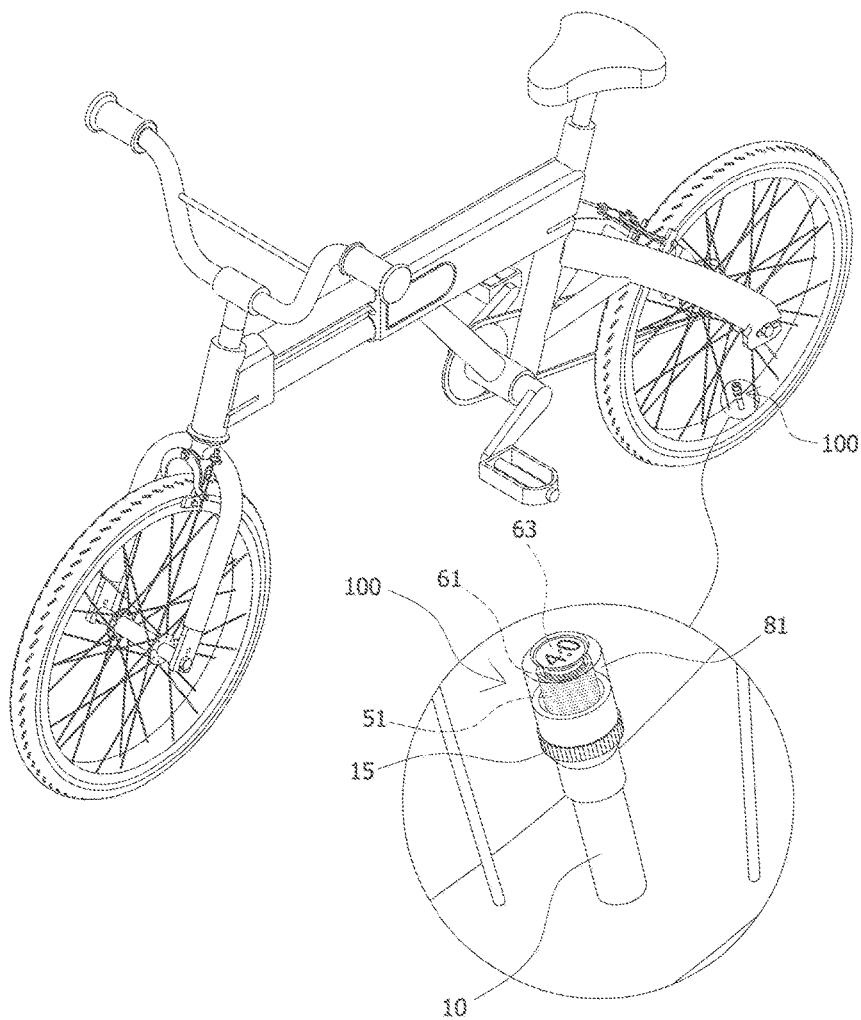
FIG. 4 is a schematic view showing the bicycle tire pressure cap applied in a bike.

FIG. 1 and FIG. 4 disclose a bicycle tire pressure cap, used with a bicycle tire valve (10). The tire pressure cap (100) comprises a metal case (1), an anti-leak washer (2), a ventilation disc (3), a rubber gasket (4), a floating holder (5), a warning plug (6), a spring (7) and a transparent cover (8).

The metal case (1) sequentially includes an upper orifice (11) and a lower orifice (12) disposed in an upper end thereof, a lower screw hole (13) disposed in a lower end thereof and configured to screw on the tire valve (10), a small keyhole (14) disposed between the lower orifice (12) and the lower screw hole (13) for connecting therebetween, and the aperture of said upper orifice (11) is larger than that of the lower orifice (12). The anti-leak washer (2) is a disc-shaped body having an opening (21) in the center thereof and is located in the lower screw hole (13), and a top surface thereof is contacted with an inner bottom side of the lower screw hole (13) and a bottom surface thereof is contacted with a top edge of the tire valve (10) to prevent air leak. The ventilation disc (3) is located in the lower orifice (12) and a top part of which is located in the upper orifice (11), including an air hole (31) in an eccentric position thereof, and a tenon (32) disposed at a center of a bottom surface thereof and fitting the tire valve (10) through the opening (21). The rubber gasket (4) is a disc-shaped body located in the lower orifice (12) and on a top surface of the ventilation disc (3), including a frame (41) disposed at an edge thereof, a convex cone (42) disposed in a center thereof, and a groove (43) between the frame (41) and the convex cone (42); the diameter of the rubber gasket (4) is larger than that of the lower orifice (12). The floating holder (5) is located at the top of the rubber gasket (4), from top to bottom, including a hollow top holder (51) having an upward opening and a hollow bottom holder (52) having a downward opening; the diameter of the top holder (51) is greater than the diameter of the bottom holder (52); the bottom holder (52) having a bottom edge is fitted into the groove (43); the top holder (51) having an inner bottom surface includes a convex pin (53) in a center thereof. The warning plug (6) is a hollow body, and a bottom end of which is fitted into the top holder (51); the warning plug (6) includes an annular warning zone (61) disposed on an outer surface thereof and has a color different from that of the floating holder (5), a disc (62) disposed at a top end thereof, and a sticker (63) affixed to a top surface of the disc (62) and marked with tire pressure. The spring (7) includes an elastic segment (71) in an upper part thereof and a support segment (72) in a lower part thereof. The elastic segment (71) is disposed in the warning plug (6) and the support segment (72) is disposed in the top holder (51) and fitted over the convex pin (53). The transparent cover (8) is located on the top of the metal case (1) and covers the warning plug (6) and floating holder (5) which includes a hollow cylindrical body (81) and a flange (82) joined to a bottom end of the body (81) and slightly smaller than the diameter of the body (81). The flange (82) is inserted into the upper orifice (11), and a bottom edge of which presses an edge of a top surface of the frame (41).

As mentioned above, the metal case (1), anti-leak washer (2), ventilation disc (3), rubber gasket (4), floating holder (5), warning plug (6), spring (7) and transparent cover (8) form the tire pressure warning cap (100) of the present invention, the structure of traditional tire pressure warning cap is simplified, the combination of ventilation disc (3), rubber gasket (4) and spring (7) solves the problem of using complex mechanism to reflect tire pressure. The upper floating holder (5) and warning plug (6) enable the user to observe current tire pressure directly through the transparent cover 8. Different colors and functional structure of human vision and psychological reaction prevent the user from overlooking the tire pressure variation.

Secondly, the spring (7) is characterized by elastic segment (71) and support segment (72). Due to the vertical elastic force of elastic segment (71), the floating holder (5) and warning plug (6) are unlikely to deviate and fail under external force during relative displacement. On the other hand, the support segment (72) enlarges the contact area, so that the floating holder (5) can be pushed stably.

The rubber gasket (4) and transparent cover 8 tightly fit the metal case 1, providing enough connection without increasing the cost. Deviation is unlikely to be resulted from external force in long-term usage, the durability is perfect.

Furthermore, the user can see the poundage on the sticker (63) clearly through the transparent cover (8). The tire pressure poundage is determined according to the tire size and model and the design tire pressure values of different brands. Different models of spring (7) result in different tire pressure poundages. Therefore, the user must choose suitable tire pressure warning cap (100) for his tire.

When the transparent cover (8) is broken, the eccentric air hole (31) can prolong the air leak, so that the user has more chances to find the abnormity of tire pressure, the safety is enhanced effectively.

The floating holder (5) is not only pushed by the tire pressure, but also positioned by spring (7). The aforesaid effects and warning plug (6) enable the user to see whether the warning plug (6) is exposed or how much it is exposed, so as to judge whether the tire pressure is sufficient or not.

For example, the floating holder (5) is green, the body of warning plug (6) is yellow, the annular warning zone (61) is red. When the tire pressure is sufficient, the floating holder (5) is pushed to the top end as the pushing force resulted from tire pressure is greater than the jacking force of spring (7), the annular warning zone (61) is covered, the floating holder (5) is revealed. When the tire pressure is slightly insufficient, the floating holder (5) descends slightly, the top of the body of warning plug (6) is exposed, this is general warning, so that the user knows the tire pressure is abnormal, reminding the user to check whether the tire has been damaged by external force or not, the tire pressure has been slightly insufficient. When the tire pressure is obviously insufficient, the floating holder (5) descends again, the annular warning zone (61) is exposed, this is serious warning, meaning the tire pressure has been obviously insufficient, the tire pressure must be supplemented as soon as possible.

The red, yellow and green colors are used, because the retina contains rod and three kinds of cone photosensory cells. The rod cell is very sensitive to yellow light, the three kinds of cone cells are most sensitive to red light, green light and blue light respectively. Due to this visual structure, human is most likely to recognize red and green, yellow and blue are easy to recognize, but the eyeball has less photosensory cells sensitive to blue light, so the red, green and yellow are easier to recognize.

The colors can imply activities. Red represents hot and violent most strongly, followed by yellow, and green implies cool and calm. Moreover, the red light has the longest wavelength among visible light rays, it is likely to be noticed. Humans are most sensitive to yellow. The green contrasts with red, the color switching can be detected immediately. Therefore, red often represents danger, yellow represents caution, and green represents safety.

Figure 3:
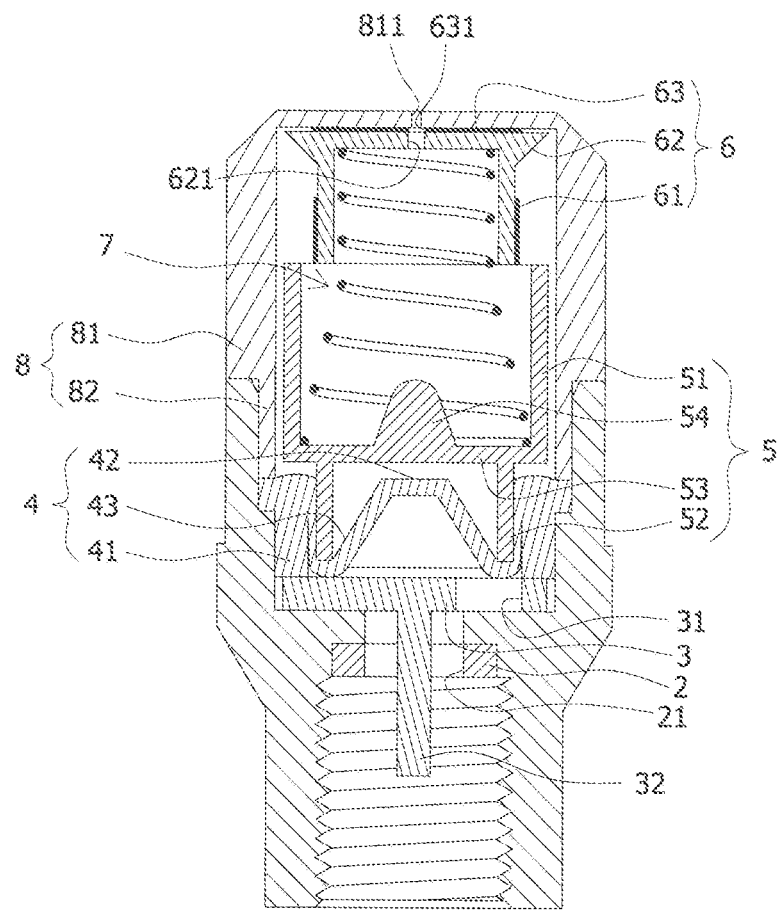
FIG. 3 is a cross-sectional view of the bicycle tire pressure cap.

Referring to FIG. 3, when the tire pressure warning cap (100) is not used, the floating holder (5) is relatively low under the recovery and tension of spring (7), the warning plug (6) is relatively high under the recovery and tension of spring (7), the user can see the overall appearance of warning plug (6) through the transparent cover (8).

Figure 5:
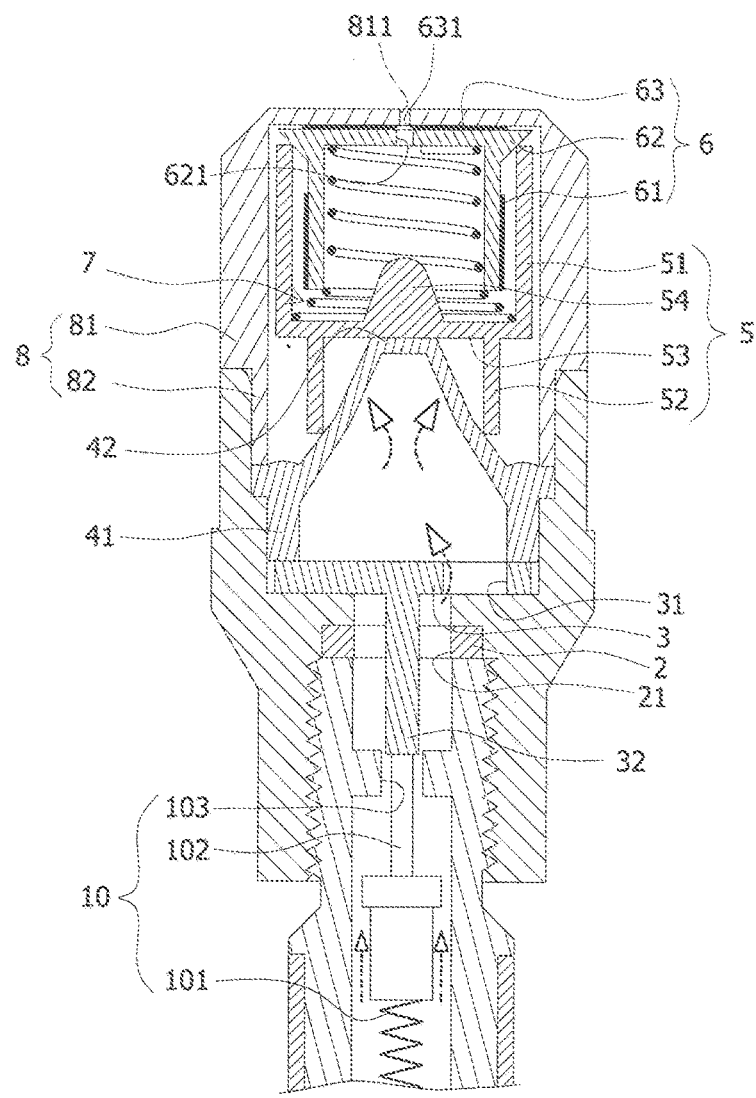
FIG. 5 is a schematic view showing the tire pressure is sufficient when the bicycle tire pressure cap is jointed to a tire valve.

As shown in FIG. 5, when the tire pressure cap (100) is screwed on the valve (10) the tenon (32) ejects the pintle (102) down, the valve spring (101) is compressed, the high pressure air in the tire enters the tire pressure warning cap (100) through orifice (103). When the high pressure air has entered the tire pressure warning cap (100), it lifts the convex cone (42) through the air hole (31), the floating holder (5) is jacked up, and the spring (7) is extruded.

As the spring (7) has elastic recovery and tension, the height of floating holder (5) varies with tire pressures. This variation enables the user to judge the tire pressure condition.

Figure 6:
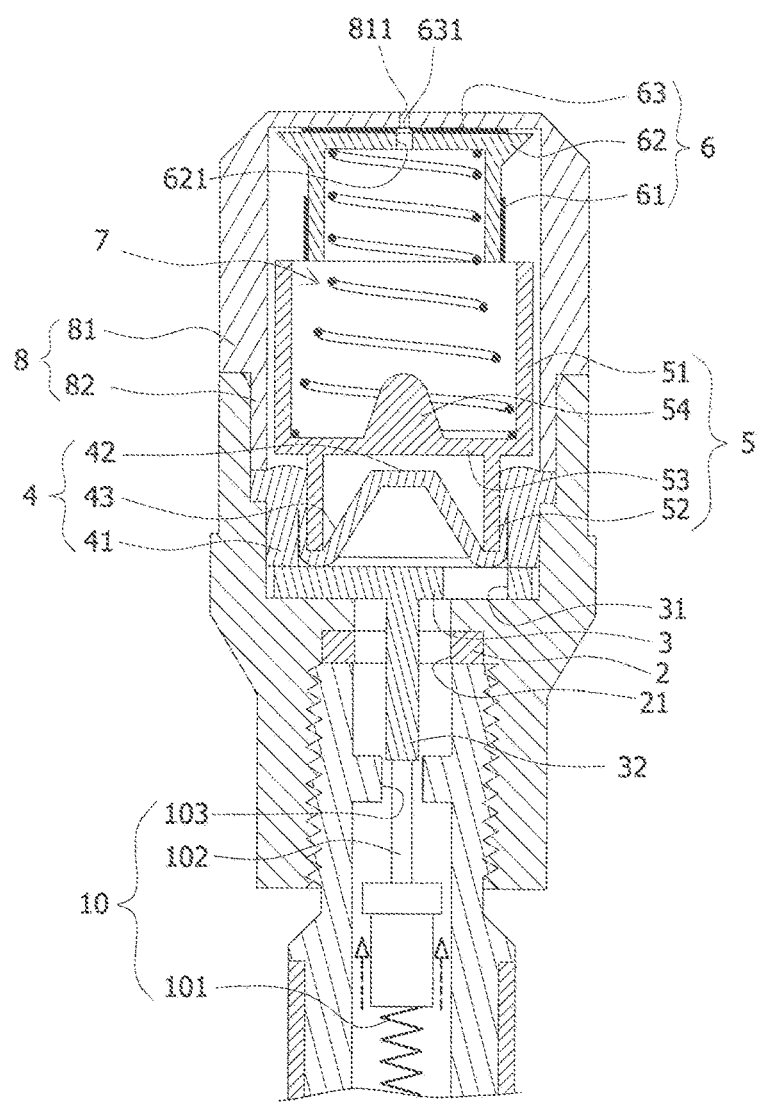
FIG. 6 is a schematic view showing the tire pressure is insufficient when the bicycle tire pressure cap is jointed to the tire valve.

As shown in FIG. 6, when the tire pressure decreases, the spring (7) presses the floating holder (5) back, the floating holder (5) descends automatically. When the top of warning plug (6) is exposed, meaning the tire pressure decreases, the tire pressure is insufficient. When the annular warning zone (61) is exposed, meaning the air shall be made up immediately, so as to keep tire pressure normal and safety.

When the tire is full of air, the thrust of tire pressure is greater than the reset force of spring (7). The floating holder (5) will be pushed to the top end, restored to the state shown in FIG. 4.

Referring to FIG. 3, when the present invention is used, whether the warning plug (6) is exposed or not is observed visually, if it is exposed, the tire is maintained and inflated, the safety warning is implemented.

Referring to FIG. 3, the air hole (31) is located exactly below the groove (43). In this manner, when the rubber gasket (4) withstands tire pressure, both the inside and outside of groove (43) are pressed uniformly, the inside or outside of groove (43) will not be pressed alone, so the pressure is equal, the floating holder (5) ascends or descends more precisely.

Figure 2:
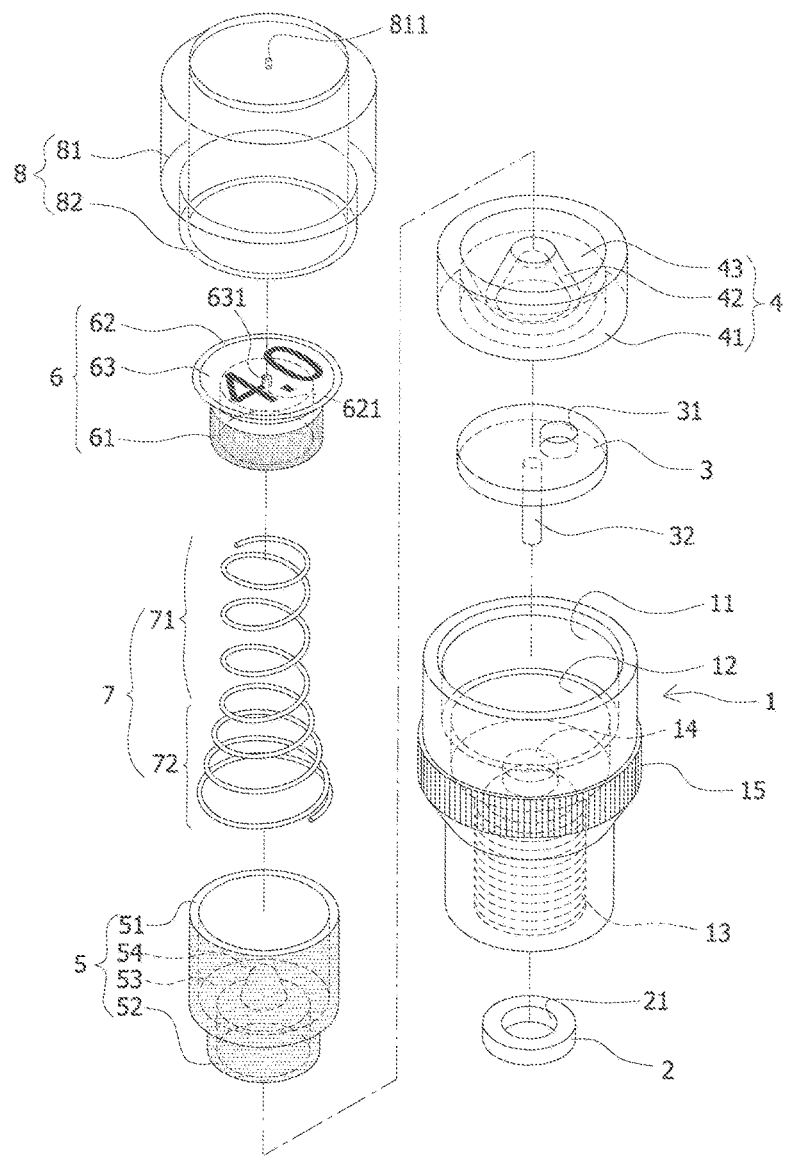
FIG. 2 is an exploded view of the bicycle tire pressure cap.

Referring to FIG. 2 and FIG. 3, there is a vent hole (621) in the center of the disc (62). There is a through hole (631) in the sticker (63) corresponding to the vent hole (621). There is a micropore (811) in the transparent cover (8) corresponding to the vent hole (621).

The application of the vent hole (621), through hole (631) and micropore (811) prevents incorrect tire pressure display. Because when the transparent cover (8) is fixed, the inside is confined. When the rubber gasket (4) is to be actuated, if the internal pressure is too high, the response of rubber gasket (4) is influenced, the response speed is reduced. The interconnected vent hole (621), through hole (631) and micropore (811) can discharge partial air, so that the rubber gasket (4) is actuated smoothly. Meanwhile the microhole (811) is much smaller than the vent hole (621) and through hole (631), the hole size is about 0.5 mm, it only vents air under the effect of surface tension. As long as it is not immersed in water, the water will not enter the transparent cover (8).

Referring to FIG. 2 and FIG. 3, the overall range of the annular warning zone (61) accounts for at least two-thirds of the total length of the warning plug (6).

The annular warning zone (61) is relatively wide, because the general warning state warns the cyclist to inflate the tire. However, if the tire pressure decreases continuously, the general warning state remains, the user safety cannot be protected effectively. Therefore, the setting mode of annular warning zone (61) can warn the user as early as possible before an emergency happens, so that the user can handle the situation early to prevent dangers.

Referring to FIG. 2 and FIG. 3, the top holder (51) is longer than the bottom holder (52), and the total length of the bottom holder (52) does not exceed one-third of the total length of the floating holder (5). Such top holder (51) and bottom holder (52) lead to longer travel of top holder (51), the warning plug (6) shifts up and down smoothly, unlikely to shake.

Referring to FIG. 1 and FIG. 2, there is an anti-skid outer ring (15) in the midsection of outer surface of the metal case (1). The anti-skid outer ring (15) enables the user to combine metal case (1) with valve (10) firmly by hand instead of tools, so as to remedy the defects in traditional tire pressure warning caps.

Referring to FIG. 2 and FIG. 3, the annular warning zone (61) is a coating layer. This annular warning zone (61) can reduce the production difficulty and cost of warning plug (6), and it is unlikely to produce rejects. Even if there are problems in the production process, the products can be recycled.

The above only describes some exemplary embodiments of the present invention. Those having ordinary skills in the art may also make many modifications and improvements without departing from the conception of the invention, which shall all fall within the protection scope of the invention.

I claim:

1. A bicycle tire pressure cap, used with a bicycle tire valve (10), comprising a metal case (1), an anti-leak washer (2), a ventilation disc (3), a rubber gasket (4), a floating holder (5), a warning plug (6), a spring (7) and a transparent cover (8);

wherein the metal case (1) sequentially includes an upper orifice (11) and a lower orifice (12) disposed in an upper end of the metal case (1), a lower screw hole (13) disposed in a lower end of the metal case (1) and configured to screw on the tire valve (10), and a small keyhole (14) disposed between the lower orifice (12) and the lower screw hole (13) for connecting therebetween, and an aperture of the upper orifice (11) is larger than that of the lower orifice (12);

wherein the anti-leak washer (2) is a disc-shaped body having an opening (21) in a center of the washer (2); the anti-leak washer (2) is located in the lower screw hole (13), and a top surface of the washer (2) is contacted with an inner bottom side of the lower screw hole (13) and a bottom surface of the washer (2) is contacted with a top edge of the tire valve (10) to prevent air leak;

wherein the ventilation disc (3) is located in the lower orifice (12), including an air hole (31) in an eccentric position of the ventilation disc (3), and a tenon (32) disposed at a center of a bottom surface the ventilation disc (3) and fitting the tire valve (10) through the opening (21);

wherein the rubber gasket (4) is a disc-shaped body located in the lower orifice (12) and on a top surface of the ventilation disc (3), including a frame (41) disposed at an edge of the rubber gasket (4), a convex cone (42) disposed in a center of the rubber gasket (4), and a groove (43) between the frame (41) and the convex cone (42); a diameter of the rubber gasket (4) is larger than that of the lower orifice (12);

wherein the floating holder (5) is located at a top of the rubber gasket (4), including a hollow top holder (51) having an upward opening and a hollow bottom holder (52) having a downward opening; a diameter of the top holder (51) is greater than a diameter of the bottom holder (52); the bottom holder (52) having a bottom edge is-fitted into the groove (43); the top holder (51) having an inner bottom surface includes a convex pin (54) in a center of the top holder (51);

wherein the warning plug (6) is a hollow body, and a bottom end of which is fitted into the top holder (51), including an annular warning zone (61) disposed on an outer surface of the warning plug (6) and has a color different from that of the floating holder (5), a disc (62) disposed at a top end of the warning plug (6), and a sticker (63) affixed to a top surface of the disc (62) and marked with tire pressure;

wherein the spring (7) includes an upper portion (71) in an upper part of the spring (7) and a lower portion (72) in a lower part of the spring; the upper portion (71) is disposed in the warning plug (6) and the lower portion (72) is disposed in the top holder (51) and fitted over the convex pin (54);

wherein the transparent cover (8) is located on a top end of the metal case (1) and covers the warning plug (6) and floating holder (5); the transparent cover (8) includes a hollow cylindrical body (81) and a flange (82) joined to a bottom end of the body (81) and slightly smaller than a diameter of the body (81); the flange (82) is inserted into the upper orifice (11), and a bottom edge of which presses an edge of a top surface of the frame (41);

wherein the disc (62) of the warning plug (6) includes a vent hole (621) disposed at a center of the disc (62); the sticker (63) includes a through hole corresponding to the vent hole (621); the transparent cover (8) includes a micropore (811) corresponding to the vent hole (621).

2. The bicycle tire pressure cap according to claim 1, wherein the air hole (31) is located exactly below said groove (43).

3. The bicycle tire pressure cap according to claim 1, wherein the overall range of the annular warning zone (61) accounts for at least two-thirds of a total length of the warning plug (6).

4. The bicycle tire pressure cap according to claim 1, wherein the top holder (51) is longer than the bottom holder (52), and a total length of the bottom holder (52) does not exceed one-third of a total length of the floating holder (5).

5. The bicycle tire pressure cap according to claim 1, wherein the metal case (1) includes an anti-skid outer ring (15) disposed in a middle of an outer surface of the metal case (1).

6. The bicycle tire pressure cap according to claim 1, wherein the annular warning zone is a coating layer.

* * * * *